ions comprising linear polyethylene.
United States Patent Office 2,881,148
Patented Apr. 7, 1959

2,881,148

PLASTICIZED LINEAR POLYETHYLENE COMPOSITION

Max Henry Dilke, Coulsdon, England, assignor to The Distillers Company Limited, Edinburgh, Scotland, a British company No Drawing. Application January 2, 1957
Serial No. 632,004

Claims priority, application Great Britain January 25, 1956

3 Claims. (Cl. 260—33.6)

The present invention relates to plasticised composi-
Two types of high molecular weight, solid polyethylene are known. In the first type, the polyethylene molecules contain a relatively high proportion of branch chains and consequently a relatively high proportion of methyl groups. In the second type, known as linear polyethylene, the molecules consist essentially of long, unbranched carbon chains consisting of linked methylene groups and consequently the number of methyl groups in the molecule is relatively low.

Compared with branched chain polyethylenes, linear polyethylenes have improved distortion properties, e.g. higher softening points. However, they possess certain disadvantages, such as, for instance, lower flexibility than branched polyethylenes. It has now been found that the plasticisation of linear polyethylene improves those properties of the linear polyethylene in which it was inferior to branched polyethylene of similar molecular weight. Moreover the plasticisation of linear polyethylene does not cause much deterioration of the exceedingly good heat distortion properties of the linear polyethylene.

Very few plasticisers are known which are entirely satisfactory for the plasticisation of branched polyethylene, the usual defect being that the plasticiser exudes from the plasticised composition over a period of time. No plasticisers have been described for linear polyethylenes.

An object of the present invention is to provide a plasticised composition comprising linear polyethylene which shows improvements in those properties in which linear polyethylene is inferior to branched polyethylene. A further object of the present invention is to provide a plasticised composition comprising linear polyethylene in which there is substantially no tendency for the plasticiser to exude from the composition.

According to the present invention the plasticised composition comprises a linear polyethylene plasticised with a mono- or di-isopropyl naphthalene.

Any linear polyethylene can be plasticised with a mono- or di-isopropyl naphthalene to give rise to plasticised compositions according to the present invention. The term linear polyethylene is employed in its usual sense to denote solid, high molecular weight polymers obtained by the homopolymerisation of ethylene under such conditions that the molecular structure of the polymer consists essentially of straight carbon chains, i.e. there are relatively few branch chains in the polyethylene molecules. Such polymers have a density of at least 0.95. The preparation of linear polyethylenes has been described, for instance, in Belgian Patents 530,617, 533,362, 534,888 and 534,792.

Any mono- or di-isopropyl naphthalene, or mixture of the mono- and/or the di-isopropyl naphthalenes can be used as plasticiser for linear polyethylenes. These compounds are liquids and may be incorporated in the polyethylene by any of the standard techniques known to those skilled in the art. Most conveniently, the plasticised compositions are formed by physically working the linear polyethylene and the plasticiser together as, for example, on heated rolls.

The relative quantities of linear polyethylene and plasticiser can be varied considerably and compositions containing as little as 1% by weight of plasticiser show some improved properties. For most purposes, the preferred compositions contain from 5 to 50% of plasticiser based on the weight of linear polyethylene present.

The plasticised compositions of the present invention are homogeneous and have the advantage that the tendency for the plasticiser to exude from articles made from the compositions is negligible. Surprisingly it is found that the mono- and di-isopropyl naphthalenes exude from branched polyethylenes which have been plasticised therewith and thus the stability of the plasticised compositions of the present invention is very unexpected.

The following examples illustrate the preparation and properties of compositions according to the present invention. The linear polyethylene used in Examples 1 and 2 had a density of 0.96, a "melt index" of 0.7 and a specific viscosity of 1.4 measured on a solution of the polymer in tetralin at 98.9° C. at a concentration of 6.67 grams/litres. The "melt index" of a polymer is defined as the weight in grams extruded in 10 minutes at 190° C. from a standard extrusion apparatus as described in British Standard 1972:1953.

Example 1

5 parts by weight of a mixture of di-isopropyl naphthalenes (boiling point 113–114° C. at 0.5 mm. of mercury pressure) was milled with 15 parts by weight of linear polyethylene (a weight ratio of polyethylene to plasticiser of 3:1) at 150° C. to give a homogeneous mixture which was pressed into a tough flexible sheet of tensile strength 2870 pounds per square inch. The heat distortion properties both of this composition and of the unplasticised polyethylene were then measured by the softening point method described in British Standard Specification 1493:1948. In both cases the temperature at which the test beam passed through an angular deflection of 80° was noted.

|  | °C. |
|---|---|
| Unplasticised linear polyethylene | 131 |
| Plasticised composition | 125 |

The heat distortion temperature of the plasticised composition is thus high compared with that of the branched polyethylenes; a typical example of which passes an angle of 80° at 102° C.

The flexibility of these materials was assessed by the method described in British Standard Specification 2571:1955 "Method of Determining Cold Flex Temperature." The Clash-Berg apparatus was used and the deflection at 20° C. was recorded.

|  | °C. |
|---|---|
| Linear polyethylene | 50 |
| Plasticised composition | 143 |

When a sheet prepared from this composition was stored for 3 months there was no sign of the plasticiser exuding.

Compositions prepared from the same polyethylene but using a pure isomer in place of the mixture described above, have substantially similar properties to the plasticised composition described in Example 1.

Example 2

5 parts by weight of a mixture of α- and β-isopropyl naphthalenes (boiling point 128–130° C. at 2 mm. of mercury pressure) was milled with 15 parts by weight of the same linear polyethylene at 150° C. to give a homogeneous mixture which pressed into a tough sheet of tensile strength of 3010 lbs./square inch. The softening point of this composition was measured by the method indicated in Example 1 with the following results.

|  | °C. |
|---|---|
| Linear polyethylene | 131 |
| Plasticised composition | 127 |

When the deflection of this material was measured at 30° C. using the Clash-Berg apparatus it was found to be 134°, whereas that of linear polyethylene was 69°.

When a sheet prepared from this composition was stored for three months no exudation of plasticiser was observed.

Compositions prepared from the same polyethylene but using either pure α-isopropyl naphthalene or β-isopropyl naphthalene in place of the mixture of isomers described above, have substantially similar properties to the plasticised composition described in Example 2.

By way of comparison 5 grams of isopropyl naphthalene was milled with 15 grams of branched chain polyethylene, and the resulting composition pressed into a sheet. It was found that, on storing this sheet for only 24 hours, plasticiser exudation was very marked and droplets of plasticiser were observed on the surface of the sheet.

*Examples 3 and 4*

Example 1 was repeated with linear polyethylenes of specific viscosities of 0.9 and 2.0 respectively with similar results. In neither example was any exudation of plasticiser from the pressed sheets apparent.

Further compositions prepared from the above samples of linear polyethylene and the same plasticisers, but in which the amount of plasticiser used was varied between 1 and 50% by weight of the weight of the linear polyethylene, formed a series of plasticised compositions having many improved properties as compared with unplasticised linear polyethylene.

Mono- and di-isopropyl naphthalenes can be readily prepared from naphthalene using the Friedel-Crafts synthesis. For instance, naphthalene (250 grams) and fuller's earth No. 249 (25 grams) are placed in an autoclave fitted with a stirrer and propylene (18 litres at N.T.P.) introduced to a pressure of 105 p.s.i. The autoclave is then heated and at 120° C. the pressure begins to drop and after 20 minutes falls to zero when the temperature has reached 140° C. The autoclave is then recharged with propylene (11 litres at N.T.P.) to a pressure of 90 p.s.i. and after 15 minutes the pressure again falls to zero. The yield of mono-isopropyl naphthalenes is 62% on the naphthalene taken and contains approximately equal proportions of the two isomers. Apart from 7.5 grams of residue the remaining product has a boiling point below 168° C. at 13 millimetres of mercury pressure and consists of a mixture of di-isopropyl naphthalenes.

I claim:

1. A plasticised composition comprising a linear polyethylene plasticised with a plasticiser selected from the group consisting of mono- and di-isopropyl naphthalenes.

2. A plasticised composition as claimed in claim 1, wherein the amount of plasticiser is from 1 to 50% of the weight of the linear polyethylene present.

3. A plasticised composition comprising a linear polyethylene plasticised with a plasticiser selected from the group consisting of mono- and di-isopropyl naphthalenes, wherein the weight ratio of polyethylene to plasticiser is 3:1.

References Cited in the file of this patent
UNITED STATES PATENTS

| 2,153,141 | Engel | Apr. 4, 1939 |
| 2,691,647 | Field | Oct. 12, 1954 |

OTHER REFERENCES

Buttrey: "Plasticizers," Interscience Publishers Inc., New York (1950), pages 1 and 156 relied on.

UNITED STATES PATENT OFFICE
CERTIFICATE OF CORRECTION

Patent No. 2,881,148                                                    April 7, 1959

Max Henry Dilke

It is hereby certified that error appears in the printed specification of the above numbered patent requiring correction and that the said Letters Patent should read as corrected below.

Column 2, lines 58, 59 and 60, for

°C.

"Linear polyethylene ———————— 50
Plasticised composition ——————143"

read

—— Linear polyethylene ———————— 50°
Plasticised composition—————— 143° ——.

Signed and sealed this 4th day of August 1959.

(SEAL)
Attest:

KARL H. AXLINE                                                        ROBERT C. WATSON

Attesting Officer                                                  Commissioner of Patents